(12) United States Patent
Lee et al.

(10) Patent No.: US 11,423,720 B2
(45) Date of Patent: Aug. 23, 2022

(54) SMARTKEY, CONTROL METHOD THEREOF AND DETECTION MODEL GENERATION APPARATUS FOR DETECTING RELAY ATTACK BASED ON LF FINGERPRINTING

(71) Applicant: KOREA UNIVERSITY RESEARCH AND BUSINESS FOUNDATION, Seoul (KR)

(72) Inventors: Dong Hoon Lee, Seoul (KR); Kyungho Joo, Seoul (KR); Wonsuk Choi, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 28 days.

(21) Appl. No.: 17/082,593

(22) Filed: Oct. 28, 2020

(65) Prior Publication Data

US 2021/0125437 A1 Apr. 29, 2021

(30) Foreign Application Priority Data

Oct. 28, 2019 (KR) .......... 10-2019-0134340
Apr. 29, 2020 (KR) .......... 10-2020-0052699
Sep. 9, 2020 (KR) .......... 10-2020-0115640

(51) Int. Cl.
*G07C 9/00* (2020.01)
*B60R 25/24* (2013.01)

(52) U.S. Cl.
CPC .......... *G07C 9/00309* (2013.01); *B60R 25/24* (2013.01); *G07C 2009/00555* (2013.01); *G07C 2009/00769* (2013.01)

(58) Field of Classification Search
CPC .......... B60R 25/30; B60R 25/24; G07C 2009/00555; G07C 9/00309; G07C 2009/00769; G07C 2009/00507
See application file for complete search history.

(56) References Cited

U.S. PATENT DOCUMENTS 10,369,965 B2   8/2019  Saiki et al.
10,543,808 B2   1/2020  Lin
(Continued)

FOREIGN PATENT DOCUMENTS

JP   6428655       11/2018
KR   10-1283623     7/2013
(Continued)

OTHER PUBLICATIONS

Notice of Preliminary Rejection dated Jan. 14, 2022 in Korean Patent Application No. 10-2020-0115640 and English-language translation.

*Primary Examiner* — Brian E Miller
(74) *Attorney, Agent, or Firm* — Nixon & Vanderhye, P.C.

(57) ABSTRACT

An apparatus and a method of detecting an attack based on LF fingerprinting are provided. A smart key which is an attack detection apparatus includes a communication interface, a memory storing a classifier, and a processor configured to generate a first signal by removing a carrier frequency of a signal received from a vehicle, demodulate the first signal and extract at least one of a second signal of a preamble region or a third signal of an idle region, extract a feature of at least one of the first signal, the second signal, or the third signal, and detect whether there is a relay attack by using an output value of the classifier for the extracted feature.

20 Claims, 11 Drawing Sheets

(56) References Cited

U.S. PATENT DOCUMENTS

| | | | |
|---|---|---|---|
| 2009/0206989 A1 | 8/2009 | Leitch | |
| 2013/0272714 A1* | 10/2013 | Ohkubo | G08C 23/04 |
| | | | 398/106 |
| 2019/0130683 A1* | 5/2019 | Eber | G07C 9/00309 |
| 2020/0017071 A1* | 1/2020 | Casamassima | G07C 9/00309 |
| 2020/0028875 A1* | 1/2020 | Rogel | H04L 63/1466 |
| 2020/0067616 A1* | 2/2020 | Blokh | G06N 20/00 |
| 2020/0348406 A1* | 11/2020 | Jain | G01S 13/886 |
| 2020/0408868 A1* | 12/2020 | Eggert | H04W 12/12 |
| 2021/0051483 A1* | 2/2021 | Soryal | H04L 9/3271 |
| 2021/0125437 A1* | 4/2021 | Lee | B60R 25/24 |
| 2021/0246693 A1* | 8/2021 | Elangovan | G06F 21/34 |
| 2021/0295623 A1* | 9/2021 | Nawa | H04W 12/68 |
| 2021/0397683 A1* | 12/2021 | Liem | G06N 3/08 |
| 2021/0400048 A1* | 12/2021 | Liem | G06F 21/32 |
| 2021/0409067 A1* | 12/2021 | Zeng | H04B 1/719 |

FOREIGN PATENT DOCUMENTS

| | | |
|---|---|---|
| KR | 10-1938856 | 1/2019 |
| WO | 2019/044002 | 3/2019 |

* cited by examiner

FIG. 5

| Feature | Description |
|---|---|
| Mean | $\mu = \frac{1}{N}\sum_{i=1}^{N} x(i)$ |
| Standard Deviation | $\sigma = \sqrt{\frac{1}{N}\sum_{i=1}^{N}(x(i)-\bar{x})^2}$ |
| Average Deviation | $D = \frac{1}{N}\sum_{i=1}^{N}|x(i)-\mu|$ |
| Skewness | $\gamma = \frac{\frac{1}{N}\sum_{i=1}^{N}(x(i)-\mu)^3}{\sigma^3}$ |
| Kurtosis | $\beta = \frac{\frac{1}{N}\sum_{i=1}^{N}(x(i)-\mu)^4}{\sigma^4}$ |
| RMS | $RMS = \sqrt{\frac{1}{N}\sum_{i=1}^{N}(x(i))^2}$ |
| Lowest Value | $L = Min\{x(i)|i=1..N\}$ |
| Highest Value | $H = Max\{x(i)|i=1..N\}$ |
| ZCR | $ZCR = \frac{1}{N}\sum_{i=1}^{N}|s(i)-s(i-1)|$ where $s(i) = 1$ if the signal has a positive amplitude at time $i$ and 0 otherwise. |
| Non-negative Count | $NC = |S|$, where $S = \{i|x(i) \geq 0\}$ |

| Feature Name | Description |
|---|---|
| Spec. Centroid | $\mu = \frac{\sum_{i=1}^{N} f_i \cdot y_m(i)}{\sum_{i=1}^{N} y_m(i)}$ |
| Spec. Entropy | $H = -\sum_{i=1}^{N} w_i \cdot \log_2 w_i$, where $w_i = \frac{y_m(i)}{\sum_{i=1}^{N} y_m(i)}$ |
| Spec. Spread | $\sigma = \sqrt{\sum_{i=1}^{N}((f_i-\mu)^2 \cdot w_i)}$ |
| Spec. Skewness | $Skewness = \frac{\sqrt{\sum_{i=1}^{N}((f_i-\mu)^3 \cdot w_i)}}{\sigma^3}$ |
| Spec. Kurtosis | $Kurtosis = \frac{\sqrt{\sum_{i=1}^{N}((f_i-\mu)^4 \cdot w_i)}}{\sigma^4}$ |
| Spec. Flatness | $Flatness = \sum_{i=1}^{N} f_i y_m(i) \cdot \frac{\prod_{i=1}^{K} y_m(i)^{\frac{1}{K}}}{\frac{1}{N}\sum_{i=1}^{N} y_m(i)}$ |
| Spec. Brightness | $Brightness = \sum_{i=f_c}^{N} y_m(i)$, where $f_c$ is the cut-off frequency |
| Spec. Roll off | $\operatorname*{argmin}_{f_c|i=1..N} \sum_{i=1}^{f_c} y_m(i) \geq 0.85 \cdot \sum_{i=1}^{N} y_m(i)$ |
| Spec. Irregularity | $Irregularity = \frac{\sum_{i=1}^{N-1}(y_m(i)-y_m(i+1))^2}{\sum_{i=1}^{N-1}(y_m(i))^2}$ |
| Spec. flux | $Flux = \sum_{i=1}^{N-1}(N(i)-N(i+1))^2$, where $N(i)$ is the normalized magnitude as $N(i) = \frac{y_m(i)}{\sum_{i=1}^{N} y_m(i)}$ |

FIG. 6A
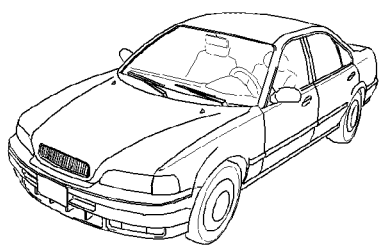 STATE INFORMATION OF A VEHICLE
(TEMPERATURE, HUMIDITY,
BATTERY RESIDUAL AMOUNT, ETC.)
→ 
PERFORMING FEATURE
CORRECTION REFLECTING
THE STATE INFORMATION

SMARTKEY, CONTROL METHOD THEREOF AND DETECTION MODEL GENERATION APPARATUS FOR DETECTING RELAY ATTACK BASED ON LF FINGERPRINTING

CROSS-REFERENCE TO RELATED APPLICATION(S)

This application is based on and claims priority under 35 U.S.C. § 119(a) of a Korean patent application number 10-2020-0115640, filed on Sep. 9, 2020, a Korean patent application number 10-2020-0052699, filed on Apr. 29, 2020, and a Korean patent application number 10-2019-0134340, filed on Oct. 28, 2019 in the Korean Intellectual Property Office, the disclosures of which are incorporated by reference herein in their entireties.

BACKGROUND

1. Field

The disclosure relates to a method of detecting an attack targeted to a vehicle or a smart key, and more particularly, to a smart key that can detect an attack by extracting a feature of a signal received from a vehicle and learning a classifier, a control method thereof, and a detection model generation apparatus.

2. Description of Related Art

A keyless entry system (KES) of a vehicle is a convenience function that makes the door of a vehicle opened and closed and the engine started without intervention of a driver through RF communication between the vehicle and a smart key, even if the driver does not directly operate the smart key.

Despite such convenience, a weak point of a KES such as a relay attack has been found, and various cyber attacks using this are being made.

However, vehicle manufacturers are still producing vehicles without an additional security measure, and thus a measure for preventing attacks in this regard is needed.

SUMMARY

A technical task that the disclosure aims to achieve is providing a smart key that learns a classifier by using a feature of a signal received from a vehicle, and can detect an attack through this, a control method thereof, and a detection model generation apparatus.

A smart key according to an embodiment of the disclosure includes a communication interface, a memory storing a classifier, and a processor configured to generate a first signal by removing a carrier frequency of a signal received from a vehicle through the communication interface, demodulate the first signal and extract at least one of a second signal of a preamble region or a third signal of an idle region, extract a feature of at least one of the first signal, the second signal, or the third signal, and detect whether there is a relay attack by using an output value of the classifier for the extracted feature.

Also, a detection model generation apparatus according to an embodiment of the disclosure includes a communication interface, a memory, and a processor configured to, with respect to each of a plurality of signals received from a vehicle through the communication interface, generate a first signal by removing a carrier frequency, demodulate the first signal and extract at least one of a second signal of a preamble region or a third signal of an idle region, extract a feature of at least one of the first signal, the second signal, or the third signal, and learn a classifier by using features extracted for each of the plurality of signals, wherein the processor may calculate a normalization parameter including a mean and an average deviation of output values of the learned classifier.

Meanwhile, a control method of a smart key according to an embodiment of the disclosure includes the steps of generating a first signal by removing a carrier frequency of a signal received from a vehicle, demodulating the first signal and extracting at least one of a second signal of a preamble region or a third signal of an idle region, extracting a feature of at least one of the first signal, the second signal, or the third signal, and detecting whether there is a relay attack by using an output value of the classifier for the extracted feature.

According to a smart key and a detection model generation apparatus according to an embodiment of the disclosure, there is an effect that a car theft accident can be prevented and convenience can be provided to a driver by constructing a safe user authentication system by protecting a keyless entry system (KES).

Also, as a smart key corrects a feature by using state information of a vehicle, a problem that incorrect detection occurs can be resolved.

BRIEF DESCRIPTION OF THE DRAWINGS

For more sufficient understanding of the drawings referred to in the detailed description of the disclosure, detailed description of each drawing is provided.

FIG. 5 is a diagram for illustrating extracted features according to an embodiment of the disclosure;

FIG. 6A is a diagram for illustrating a method of correcting an extracted feature according to various embodiments of the disclosure;

DETAILED DESCRIPTION

Figure 1:
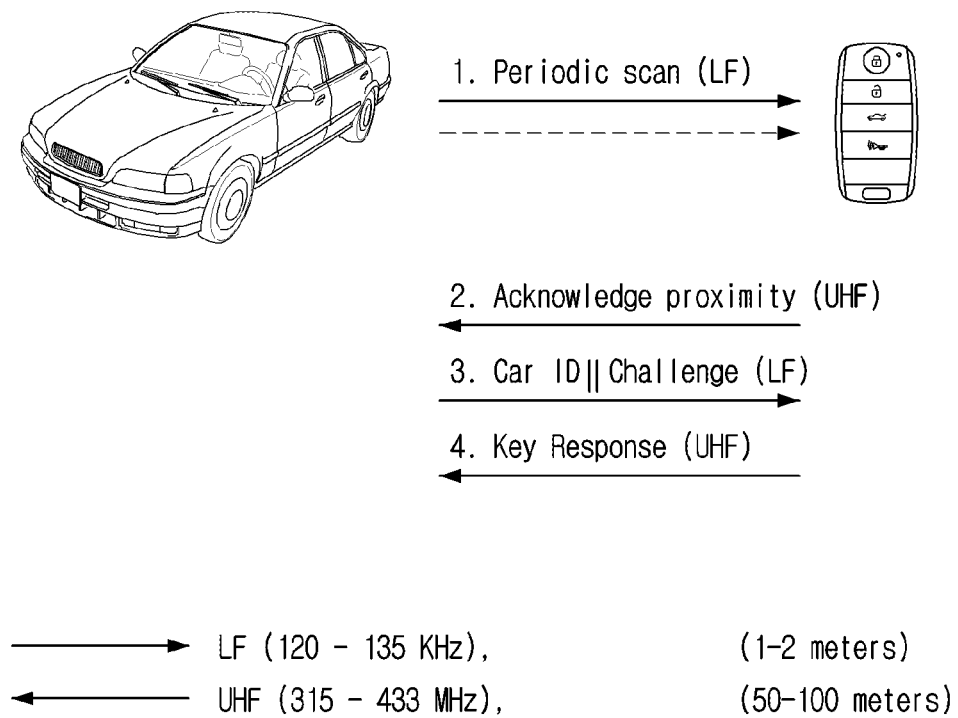
FIG. 1 illustrates a PKES system according to an embodiment of the disclosure.

Specific structural or functional descriptions of embodiments according to the concept of the disclosure disclosed in this specification are just suggested for the purpose of explaining embodiments according to the concept of the disclosure, and embodiments according to the concept of the disclosure may be implemented in various forms, and are not limited to the embodiments described in this specification.

Also, various modifications may be made to the embodiments according to the concept of the disclosure, and there may be various forms of embodiments. Accordingly, embodiments will be illustrated in drawings, and the embodiments will be described in detail in this specification. However, it should be noted that the various embodiments are not for limiting the embodiments according to the concept of the disclosure to specific embodiments, but they should be interpreted to include all modifications, equivalents, or alternatives of the embodiments included in the ideas and the technical scopes of the disclosure.

In addition, terms such as "first," "second" and the like may be used to describe various elements, but the terms are not intended to limit the elements. Such terms are used only for the purpose of distinguishing one element from another element. For example, a first element may be called a second element, and a second element may be called a first element in a similar manner, without departing from the scope of protection according to the concept of the disclosure.

Meanwhile, the description in this specification that one element is "coupled to" or "connected to" another element should be interpreted to include both the case wherein one element is directly coupled to or connected to another element and the case wherein there is still another element between the elements. In contrast, the description that one element is "directly coupled" or "directly connected" to another element should be interpreted to mean that still another element does not exist between the elements. Other expressions describing relations between elements, i.e., expressions such as "between" and "right between," and "adjoin" and "directly adjoin," etc. should be interpreted in the same manner.

In addition, terms used in this specification are just used to describe specific embodiments, and are not intended to limit the disclosure. Also, singular expressions include plural expressions, as long as they do not obviously mean differently in the context. Further, in this specification, terms such as "include" and "have" should be construed as designating that there are such characteristics, numbers, steps, operations, elements, components, or a combination thereof described in this specification, but not as excluding in advance the existence or possibility of adding one or more of other characteristics, numbers, steps, operations, elements, components, or a combination thereof.

Also, all terms used herein, including technical or scientific terms, have meanings identical to those generally understood by those of ordinary skill in the art to which the disclosure belongs, unless defined differently. Terms defined in dictionaries generally used may be interpreted to have the same meaning as the contextual meaning in the related art. Also, unless defined obviously in this specification, the terms used herein may not be interpreted to have an ideal or overly formal meaning.

Hereinafter, the embodiments of the disclosure will be described in detail with reference to the drawings accompanying this specification. However, it is not intended that the scope of the disclosure is restricted or limited by the embodiments. Also, the same reference numerals suggested in each drawing refer to the same members.

FIG. 1 illustrates a PKES system according to an embodiment of the disclosure. Hereinafter, operations of a passive keyless entry and start (PKES) system or a keyless entry system (KES) will be described with reference to FIG. 1.

A vehicle and a smart key included in a PKES system use two kinds of frequency channel signals for communicating with each other in the PKES system. The vehicle uses a low frequency (LF, 120 to 135 KHz) signal of which reaching distance is short as one to two meters, and the smart key uses an ultra high frequency (UHF, 315 to 433 MHz) signal of which reaching distance is 50 to 100 meters for controlling the vehicle from a far distance.

First, the vehicle periodically transmits an LF signal (a signal for identifying the existence of the smart key and/or waking up the smart key) around the vehicle, and the smart key that received the signal is woken up, and transmits an UHF signal (a signal for identifying existence) to the vehicle as a response signal for the received LF signal. In case the existence of the smart key was identified, the vehicle transmits again an LF signal including challenge information and/or identification information of the vehicle (e.g., the ID of the vehicle) to the smart key. The smart key transmits an UHF signal including response information corresponding to the challenge to the vehicle. In case the received response information was identified normally, the vehicle performs vehicle control (opening and closing of the door, the engine, etc.).

In a PKES system as described above, an attacker may perform a relay attack. A relay attack means an attack that makes a vehicle and a smart key determined to be adjacent to each other by using two signal repeaters between a vehicle and a smart key of a driver, and makes vehicle control performed in the same manner as a normal process. Such an attack is possible because a vehicle cannot identify whether a response signal corresponding to a challenge transmitted from a smart key is a signal actually transmitted by a proper smart key.

Hereinafter, a method of detecting whether there is a relay attack by extracting a feature of a signal transmitted from a vehicle (or a signal that a smart key receives from a vehicle), i.e., a wake-up signal (or a wake-up message) and/or a challenge signal (or a challenge message) will be described. In this sense, the disclosure may be referred to as a method of preventing a relay attack based on LF fingerprinting.

A detecting operation is performed at a smart key, but a detection model used at a smart key is generally generated in another apparatus. For the convenience of explanation, a method of generating a detection model will be described first.

Figure 2:
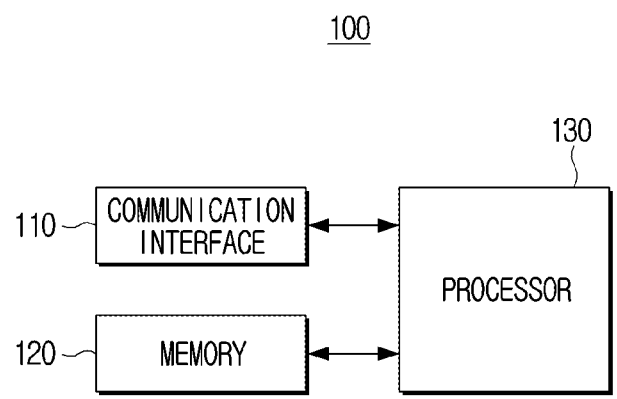
FIG. 2 is a block diagram for illustrating a detection model generation apparatus according to an embodiment of the disclosure.

FIG. 2 is a block diagram for illustrating a detection model generation apparatus 100 according to an embodiment of the disclosure.

The detection model generation apparatus 100 may mean a computing apparatus including at least one processor (or (micro) controller) and/or a memory.

According to FIG. 2, the detection model generation apparatus 100 includes a communication interface 110, a memory 120, and a processor 130.

The communication interface 110 is a component that transmits and receives a signal according to various types of communication methods. For example, the communication interface 110 may include a Wi-Fi module, a Bluetooth module, an infrared communication module, and a wireless communication module, etc. Here, each communication module may be implemented in the form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. Meanwhile, an infrared communication module performs communication according to an infrared data association (IrDA) technology of transmitting data to a near distance wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. in addition to the aforementioned communication methods.

However, the disclosure is not limited thereto, and the communication interface 110 may be any component that can perform communication with a vehicle.

The communication interface 110 may receive signals transmitted from a vehicle. The received signals may be stored in the memory 120. Depending on embodiments, the detection model generation apparatus 100 may not include the communication interface 110. In this case, signals transmitted from a vehicle may be received through a separate reception apparatus, and then stored in advance in the memory 120.

The memory 120 may refer to hardware that stores information such as data in the form of electricity or magnetism so that the processor 130, etc. can access. For this, the memory 120 may be implemented as at least one hardware among a non-volatile memory, a volatile memory, a flash memory, a hard disk drive (HDD) or a solid state drive (SSD), a RAM, a ROM, etc.

In the memory 120, at least one instruction or module necessary for the operations of the detection model generation apparatus 100 or the processor 130 may be stored. Here, an instruction is a code unit that instructs operations of the detection model generation apparatus 100 or the processor 130, and it may be drafted in a machine language which is a language that can be understood by a computer. Meanwhile, a module may be a set of a series of instructions that perform a specific work in a work unit.

Also, in the memory 120, signals received by the communication interface 110, the result of preprocessing of the processor 130, i.e., the first signal, the second signal, and the third signal, the result of feature extraction of the processor 130, i.e., features of each signal, a classifier learned by the processor 130, a normalization parameter, etc. may be stored.

The processor 130 controls the overall operations of the detection model generation apparatus 100. Specifically, the processor 130 may be connected with each component of the detection model generation apparatus 100 and control the overall operations of the detection model generation apparatus 100. For example, the processor 130 may be connected with components such as the communication interface 110, the memory 120, etc., and control the operations of the detection model generation apparatus 100.

According to an embodiment of the disclosure, the processor 130 may be implemented as a digital signal processor (DSP), a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

The processor 130 may perform preprocessing operations for each of the signals received by the communication interface 110. Preprocessing operations may include a first preprocessing operation and/or a second preprocessing operation.

The first preprocessing operation may include removal of a noise and/or removal of a carrier frequency. Specifically, the processor 130 may remove a noise included in a signal by using a specific filter (e.g., a low pass filter (LPF)). Also, the processor 130 may remove a carrier frequency and extract a signal of a baseband. A signal generated as a result of the first preprocessing operation may be referred to as Signal 1.

The second preprocessing operation may include demodulation. Specifically, the processor 130 may demodulate the first signal and extract a preamble region and an idle region. As a PKES system uses an amplitude shift keying (ASK) modulation method, the processor 130 may demodulate the first signal by using a demodulation method of ASK. ASK indicates a bit by changing the amplitude of a signal as much as a specific size (Ao) based on a center frequency (fc). A signal of which amplitude is Ao expresses a bit 1, and a signal of which amplitude is 0 expresses a bit 0. A preamble region is a region which is used for synchronization of a packet or a bit in wireless communication, and an idle region means a signal located in an interval between two LF band signals. Here, a signal of the preamble region may be referred to as Signal 2, and a signal of the idle region may be referred to as Signal 3. Signal 1, Signal 2, and Signal 3 may be stored in the memory 120.

The processor 130 may extract a feature of at least one of Signal 1, Signal 2, or Signal 3.

Specifically, the processor 130 fourier transforms Signal 1 and calculates a frequency $f_c^{offset}$ expressing the bit 1. Also, the processor 130 may measure an interval between pulses included in Signal 2. The interval between pulses (it may mean the duration time of an individual pulse) may be expressed as a bit timing offset $T_b^{offset}$. Also, the processor 130 may extract at least one feature indicating various statistical characteristics of Signal 2. The statistical characteristics extracted are illustrated in FIG. 5. In addition, the processor 130 may extract at least one statistical characteristic for Signal 3. Additionally, Signal 3, i.e., the length (or the duration time) of the idle region may be an extracted feature. The extracted features may be stored in the memory 120.

An extracted feature may be at least one of a mean, a standard deviation, an average deviation, skewness, kurtosis, a root mean square (RMS), a lowest value, a highest value, a zero-crossing rate (ZCR), a non-negative count, spec. centroid, spec. entropy, spec. spread, spec. skewness, spec. kurtosis, spec. flatness, spec. brightness, spec. roll off, spec. irregularity, or spec. flux.

The processor 130 may generate a classifier and generate a normalization parameter by using an extracted feature. Specifically, the processor 130 may perform one-class learning for an extracted feature by using a classifier model, e.g., a support vector machine (SVM), a k-NN algorithm, or a decision tree algorithm. However, the disclosure is not limited thereto, and any algorithm which can perform one-class learning can be applied regardless of the type of the algorithm. In a learning process, only a feature extracted from a normal signal is used, and a classifier is generated by using data of X % randomly selected among the entire learning data, and a test for the generated classifier may be performed by using the remaining learning data of (100−X) %. The process may be repetitively performed for Y times, and output values of the classifier for normal learning data may be accumulated and a mean $\mu_o$ and an average deviation $\sigma_o$ may be calculated, and they may be used as a normalization parameter.

Meanwhile, in the above, it was described that the main agent of a learning operation is the processor 130, but the disclosure is not limited thereto. For example, the processor 130 may be implemented as a preprocessing module, a feature extraction module, and a learning module, and each of the preprocessing module, the feature extraction module, and the learning module may respectively perform a preprocessing operation, a feature extracting operation, and a learning operation.

Figure 3:
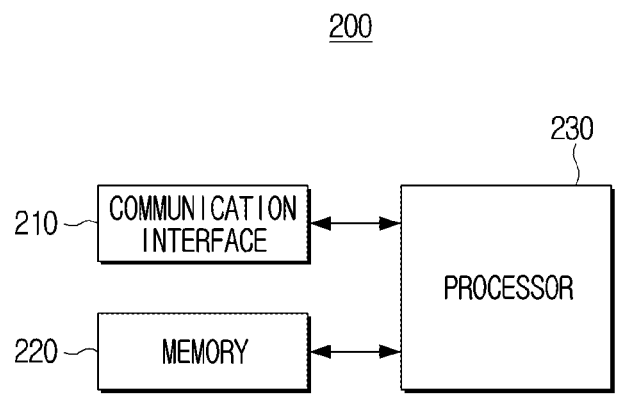
FIG. 3 is a block diagram for illustrating a smart key according to an embodiment of the disclosure.

FIG. 3 is a block diagram for illustrating a smart key 200 according to an embodiment of the disclosure.

According to FIG. 3, the smart key 200 includes a communication interface 210, a memory 220, and a processor 230. Also, in the smart key 200, a detection model (a classifier) generated by the detection model generation apparatus 100 in FIG. 2, a mean $\mu_o$, an average deviation $\sigma_o$, etc. may be stored in advance. In describing the configuration and the operation of the smart key 200, regarding contents that overlap with the previous descriptions, description of the contents will be omitted.

The communication interface 210 may communicate with a vehicle by transmitting and receiving signals or messages. Specifically, the communication interface 210 may receive a wake-up signal (a wake-up message) transmitted from a vehicle, and transmit a survival identification signal (a survival identification message) in response to the wake-up signal. Also, the communication interface 210 may receive a challenge signal (a challenge message) from a vehicle, and transmit a response signal (a response message) in response to the challenge signal. Meanwhile, in case the processor 230 detected a relay attack, the communication interface 210 may not transmit a response signal. Through this, control of a vehicle by an improper user can be prevented.

Signals transmitted and received by the communication interface 210 may be stored in the memory 220.

In the memory 220, signals transmitted and received by the communication interface 210, the result of preprocessing of the processor 230, i.e., Signal 1, Signal 2, and Signal 3, features extracted by the processor 230, the result of detection of the processor 230, a detection model (a classifier), a mean $\mu_o$, an average deviation $\sigma_o$, etc. may be stored.

The processor 230 may perform a preprocessing operation for each of the signals received by the communication interface 210. A preprocessing operation may include a first preprocessing operation and/or a second preprocessing operation.

The first preprocessing operation may include removal of a noise and/or removal of a carrier frequency. Specifically, the processor 230 may remove a noise included in a signal by using a specific filter (e.g., a low pass filter (LPF)). Also, the processor 230 may remove a carrier frequency and extract a signal of a baseband. A signal generated as a result of the first preprocessing operation may be referred to as Signal 1.

The second preprocessing operation may include demodulation. Specifically, the processor 230 may demodulate the first signal and extract a preamble region and an idle region. As a PKES system uses an amplitude shift keying (ASK) modulation method, the processor 230 may demodulate the first signal by using a demodulation method of ASK.

Here, a signal of the preamble region may be referred to as Signal 2, and a signal of the idle region may be referred to as Signal 3. Signal 1, Signal 2, and Signal 3 may be stored in the memory 220.

The processor 230 may extract a feature of at least one of Signal 1, Signal 2, or Signal 3.

Specifically, the processor 230 fourier transforms Signal 1 and calculates a frequency $f_c^{offset}$ expressing the bit 1. Also, the processor 230 may measure an interval between pulses included in Signal 2. The interval between pulses (it may mean the duration time of an individual pulse) may be expressed as a bit timing offset $T_b^{offset}$. Also, the processor 230 may extract at least one feature indicating various statistical characteristics of Signal 2. The statistical characteristics extracted are illustrated in FIG. 5. In addition, the processor 230 may extract at least one statistical characteristic for Signal 3. Additionally, Signal 3, i.e., the length (or the duration time) of the idle region may be an extracted feature. The extracted features may be stored in the memory 220.

The processor 230 may detect whether there is an attack (e.g., a relay attack) targeted to a vehicle and/or a smart key. Specifically, the processor 230 may input an extracted feature into the classifier and acquire an output value x of the classifier. Afterwards, the processor 230 normalizes the output value x by using the normalization parameter (the average $\mu_o$, the average deviation $\sigma_o$)

$$\left(\frac{|x-\mu|}{\sigma}\right).$$

Lastly, the processor 230 may detect a relay attack by comparing the normalized output value $$\frac{|x-\mu|}{\sigma}$$

and a predefined threshold value Γ. As an example, in case the normalized output value is bigger than the threshold value $$\left(\frac{|x-\mu|}{\sigma} > \Gamma\right),$$

it may be determined as a case wherein a relay attack was performed. The threshold value may be set in advance by a manager, and an exemplary value may be a value within a range of 4 to 5.

Meanwhile, the smart key 200 may further include a component for notifying a detection result to the driver (or the owner of the smart key 200). For example, the smart key 200 may include a display, and display a detection result through the display. Alternatively, the smart key 200 may include a light emitting apparatus like an LED, and notify a detection result through the light emitting apparatus. Alternatively, the smart key 200 may include a speaker, and output a detection result as a sound.

However, the disclosure is not limited thereto, and any component can be used if it is a component that can notify a detection result to a user. For example, the smart key 200 may transmit a notification result to a smartphone of a user connected with the smart key 200.

Meanwhile, in the above, it was described that the main agent of a learning operation is the processor 230, but the disclosure is not limited thereto. For example, the processor 230 may be implemented as a preprocessing module, a feature extraction module, and a detection module, and each of the preprocessing module, the feature extraction module, and the detection module may respectively perform a preprocessing operation, a feature extracting operation, and a detecting operation.

Meanwhile, in the above, it was described that the detection model generation apparatus 100 and the smart key 200 are distinguished, but the disclosure is not limited thereto. For example, the smart key 200 may additionally perform a learning operation of the detection model generation apparatus 100 other than a detecting operation. Alternatively, the detection model generation apparatus 100 may be a vehicle.

Meanwhile, an average expert in the art to which the disclosure belongs will be able to easily infer that each of the components of the detection model generation apparatus 100 and the smart key 200 illustrated in FIG. 2 and FIG. 3 indicates that they can be functionally and logically separated, and does not mean that each component should necessarily be distinguished as a separate physical apparatus or drafted as a separate code.

Figure 4:
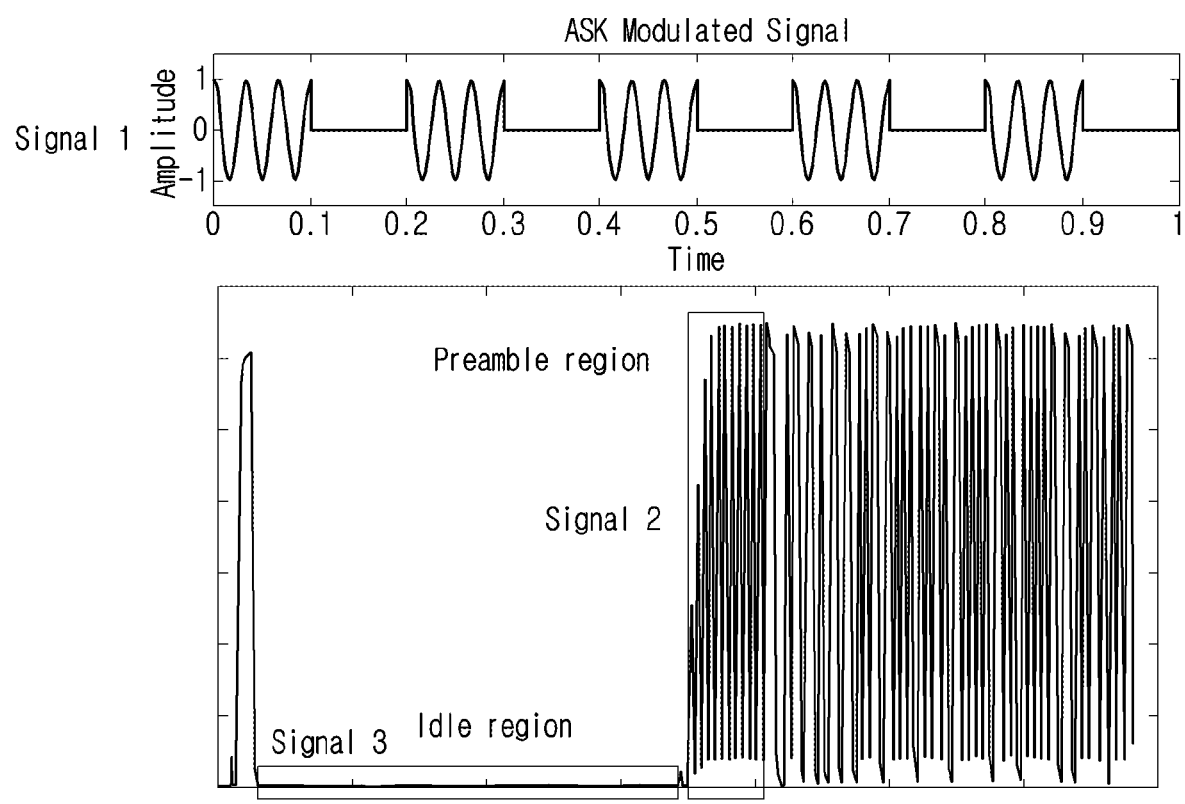
FIG. 4 is a diagram for illustrating a signal received by a smart key according to an embodiment of the disclosure.

FIG. 4 is a diagram for illustrating a signal received by a smart key according to an embodiment of the disclosure.

The smart key may receive an ASK-modulated signal. An ASK-modulated signal that the smart key received is illustrated in the upper part of FIG. 4. Depending on embodiments, the signal illustrated in the upper part of FIG. 4 may be a preprocessed signal (Signal 1), i.e., a signal from which a noise and a career frequency have been removed.

An ASK-modulated signal goes through an ASK demodulation process, and a demodulated signal is illustrated in the lower part of FIG. 4. The demodulated signal sequentially includes a wake-up signal, an idle region (Signal 3), a preamble region (Signal 2), and a payload. In the disclosure, a feature (a characteristic) is extracted from a signal of the preamble region and/or the idle region, and the classifier is learned by using the extracted feature, and a relay attack is detected by using the learned classifier.

Meanwhile, in the above, a method by which a smart key extracts a feature which is an analogue characteristic of a signal received from a vehicle, and detects whether there is an attack therefrom was described.

Meanwhile, as a feature defined above is an analogue characteristic, a signal characteristic may be changed depending on the environment or the state of the apparatus, and in this case, the accuracy of detection by a smart key may be reduced.

Hereinafter, a method for enhancing the accuracy of detection by a smart key according to correcting an extracted feature will be described.

Figure 6B:
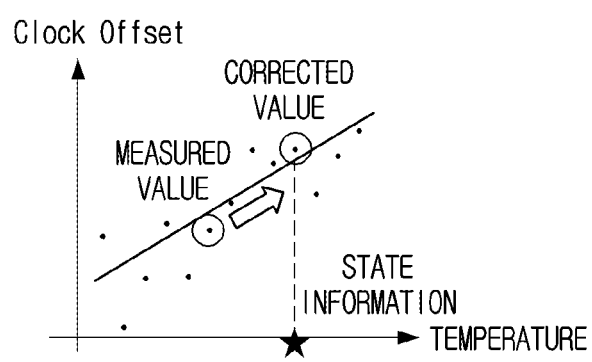
FIG. 6B is a diagram for illustrating a method of correcting an extracted feature according to various embodiments of the disclosure.
Figure 6C:
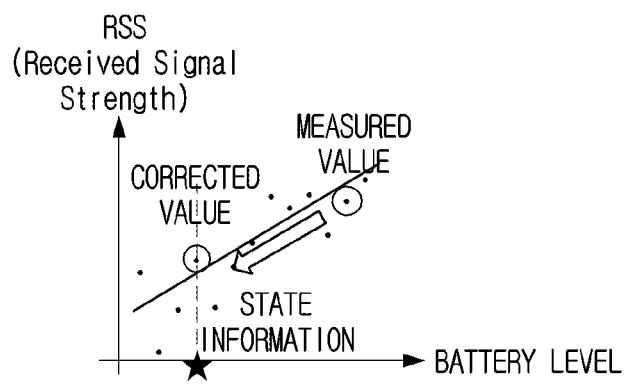
FIG. 6C is a diagram for illustrating a method of correcting an extracted feature according to various embodiments of the disclosure.

FIG. 6A to FIG. 6C are diagrams for illustrating a method of correcting an extracted feature according to various embodiments of the disclosure.

First, a vehicle may transmit state information of the vehicle to a smart key. For example, a vehicle may add state information of the vehicle to a challenge signal (or a challenge message) of the vehicle and transmit them to a smart key, as illustrated in FIG. 6A. Here, state information of the vehicle may be at least one of a temperature, humidity, or a battery residual amount. However, the disclosure is not limited thereto, and state information may include other information that may influence an analogue characteristic of a feature. Also, state information of the vehicle may be transmitted as a digital signal.

The smart key may identify state information of the vehicle from the received signal, and correct the extracted feature based on the state information of the vehicle. For example, the smart key may correct a clock offset value according to correcting temperature information to a preset value when temperature information is received, as illustrated in FIG. 6B. Alternatively, the smart key may correct a received signal strength (RSS) value according to correcting the battery level to a preset value when battery level information is received, as illustrated in FIG. 6C.

In FIG. 6B and FIG. 6C, it was described that one subordinate feature is corrected according to one state variable, but this is merely an example. For example, the smart key may correct a clock offset value based on temperature information and battery level information.

Correction of a feature as described above may be performed independently, but it may also be performed through a specific model. For example, the smart key may correct a feature by inputting state information of a vehicle into a detection model including a classifier model as described above.

Hereinafter, a detection model including a classifier model will be described.

Figure 7A:
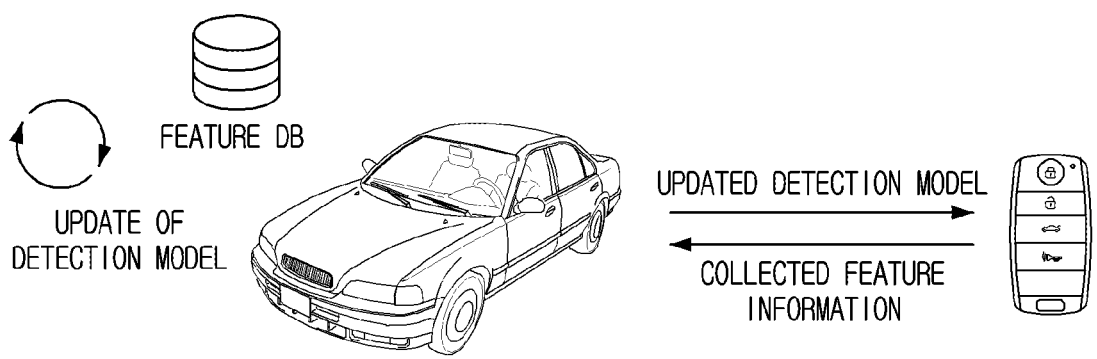
FIG. 7A is a diagram for illustrating update of a detection model according to an embodiment of the disclosure.
Figure 7B:
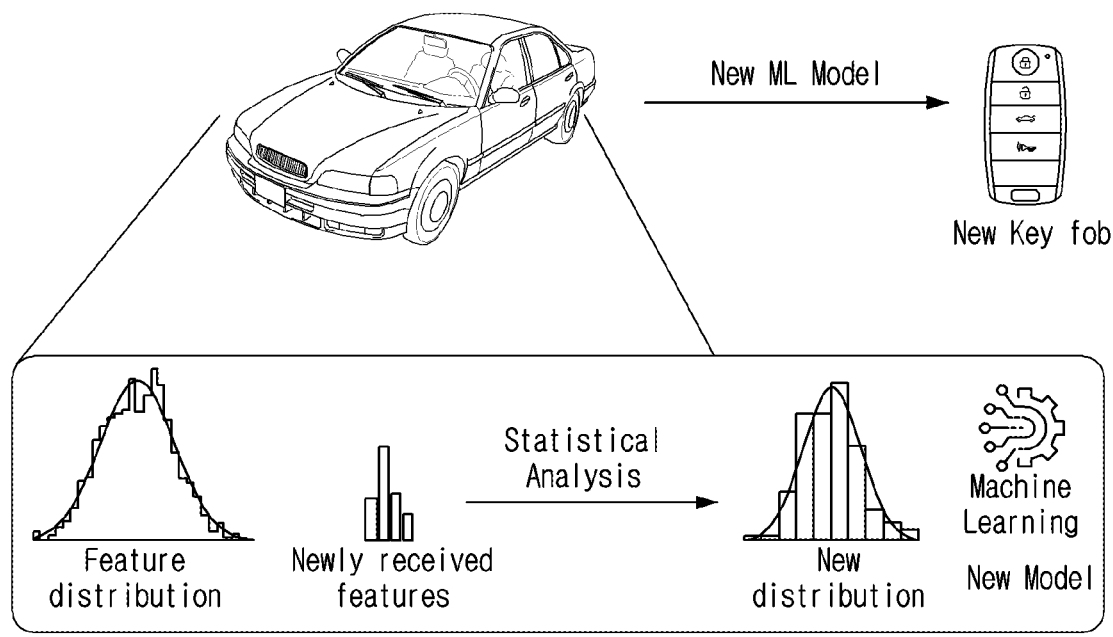
FIG. 7B is a diagram for illustrating update of a detection model according to an embodiment of the disclosure.

FIG. 7A to FIG. 7B are diagrams for illustrating update of a detection model according to an embodiment of the disclosure.

The processor 230 of the smart key may control the communication interface 210 to transmit an extracted feature to a vehicle.

The vehicle may store information on the feature received from the smart key in itself, or store the information in a cloud, or transmit the information to a detection model generation apparatus, as illustrated in FIG. 7A.

Then, if a number of times of using the smart key greater than or equal to a predetermined number of times occurs, the vehicle may update the detection module based on the updated feature. Here, the vehicle may update the detection module directly, or the detection model generation apparatus may update the detection module. In the case of the latter, the vehicle may provide a signal that a number of times of using the smart key greater than or equal to the predetermined number of times occurred to the detection model generation apparatus. In case the detection model generation apparatus updates the detection module, the detection model generation apparatus may transmit the updated detection module to the vehicle. Hereinafter, for the convenience of explanation, it will be described that the vehicle performs an updating operation.

Meanwhile, the vehicle may update the detection module based on minimum learning data, for minimizing the burden of the learning process (collection of signals and extraction of features).

Specifically, the vehicle may update the detection module by analyzing the correlation between the conventional feature database and a newly-received feature. In this case, the distribution in the left lower end of FIG. 7B may be updated to the distribution on the right side based on the newly-received distribution, and as the distribution is based on the distribution in a small number that was newly received, the burden of the learning process of the vehicle can be reduced.

Afterwards, the vehicle may transmit the updated detection module to the smart key.

Figure 8:
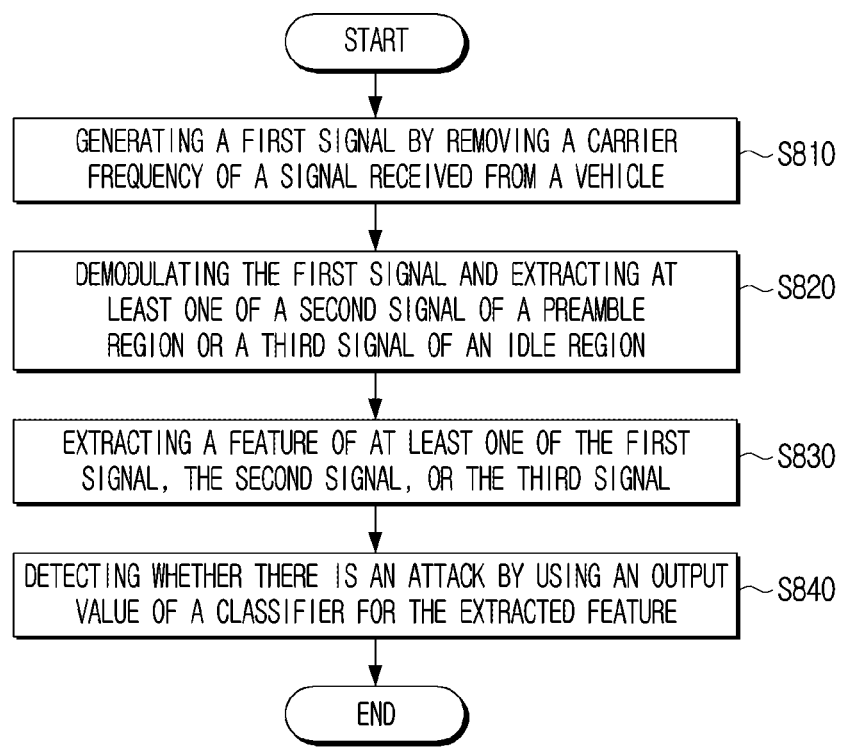
FIG. 8 is a flow chart for illustrating a control method of a smart key according to an embodiment of the disclosure.

FIG. 8 is a flow chart for illustrating a control method of a smart key according to an embodiment of the disclosure.

First, the carrier frequency of a signal received from a vehicle is removed and Signal 1 is generated at operation S810. Then, Signal 1 is demodulated and at least one of Signal 2 of a preamble region or Signal 3 of an idle region is extracted at operation S820. Then, a feature of at least one of Signal 1, Signal 2, or Signal 3 is extracted at operation S830. Then, it is detected whether there is a relay attack by using an output value of a classifier for the extracted feature at operation S840.

Here, at operation S830 of extracting a feature, Signal 1 may be fourier transformed, and a frequency expressing a bit 1 may be extracted as a feature.

Alternatively, at operation S830 of extracting a feature, the bit timing offset of Signal 2 may be extracted as a feature.

Alternatively, at operation S830 of extracting a feature, the duration time of Signal 3 may be extracted as a feature.

Here, the feature may include at least one of a mean, a standard deviation, an average deviation, skewness, kurtosis, a root mean square (RMS), a lowest value, a highest value, a zero-crossing rate (ZCR), or a non-negative count.

Meanwhile, at operation S840 of detecting, the output value may be normalized by using a predetermined mean and a predetermined standard deviation, and it may be detected whether there is a relay attack by comparing the normalized output value and a predetermined threshold value.

Also, the control method may further include the operations of, based on a relay attack not being detected, controlling the communication interface to transmit a response message for a challenge message received from the vehicle, and based on a relay attack being detected, not transmitting a response message.

According to a smart key and a detection model generation apparatus according to an embodiment of the disclosure, there is an effect that a car theft accident can be prevented and convenience can be provided to a driver by constructing a safe user authentication system by protecting a keyless entry system (KES).

Also, as a smart key corrects a feature by using state information of a vehicle, a problem that incorrect detection occurs can be resolved.

The apparatus described above may be implemented as hardware components, software components, and/or as a combination of hardware components and software components. For example, the apparatus and the components described in the embodiments may be implemented by using one or more generic-purpose computers or computers for specific purposes, such as a processor, a controller, an arithmetic logic unit (ALU), a digital signal processor, a micro-computer, a field programmable gate array (FPG), a programmable logic unit (PLU), a microprocessor, or any other apparatuses that can execute and respond to instructions. A processing apparatus may execute an operating system (OS) and one or more software applications that are performed in the operating system. Also, a processing apparatus may respond to execution of software, and access, store, manipulate, process, and generate data. For the convenience of understanding, there are cases wherein it is described that one processing apparatus is used, but a person having ordinary knowledge in the pertinent technical field may figure out that a processing apparatus may include a plurality of processing elements and/or processing elements of a plurality of types. For example, a processing apparatus may include a plurality of processors or one processor and one controller. Also, other processing configuration such as a parallel processor is possible.

Software may include computer programs, codes, instructions, or a combination of one or more of them, and may constitute a processing apparatus such that the processing apparatus operates as intended or instruct a processing apparatus independently or collectively. Software and/or data may be permanently, or temporarily embodied in specific types of machines, components, physical equipment, virtual equipment, computer storage media or apparatuses, or signal waves transmitted, for being interpreted by a processing apparatus or providing instructions or data to a processing apparatus. Also, software may be dispersed in computer systems connected through a network, and stored and executed by a dispersed method. In addition, software and data may be stored in one or more computer-readable recording media.

The method according to the embodiments of the disclosure may be implemented in the form of a program instruction that can be performed through various computer means, and recorded in a computer-readable recording medium. The computer-readable recording medium may include program instructions, data files, data structures, etc. as a single entity, or in combination. Program instructions recorded in such a medium may be those that are specifically designed and constructed for the embodiments of the disclosure or that are known to those skilled in the technical field relating to computer software and are usable. Examples of computer-readable recording media include magnetic media like a hard disk, a floppy disk, and a magnetic tape, optical media like a CD-ROM and a DVD, magneto-optical media like a floptical disk, and hardware apparatuses that are specifically constructed to store and perform program instructions like a ROM, a RAM, a flash memory, etc. Meanwhile, examples of program instructions include not only machine language codes that are made by a compiler, but also high level language codes that can be executed by a computer by using an interpreter, etc. Hardware apparatuses like the above may be constructed to operate as at least one software module for performing the operations in the embodiments, and the same is true vice versa.

Although the disclosure was described with reference to the embodiments illustrated in the drawings, the embodiments are merely exemplary ones, and a person having ordinary knowledge in the pertinent technical field would be able to understand that various modifications and other equivalent embodiments are possible therefrom. For example, an appropriate result can be achieved even if the technologies described above are performed in different orders from the method described herein, and/or the described components such as the system, the structure, the apparatus, the circuitry, etc. are coupled or combined in different forms from the method described herein, or replaced or substituted by other components or equivalents thereof. Accordingly, the genuine scope of technical protection of the disclosure should be defined by the technical idea of the registered claims appended hereto.

What is claimed is:

1. A smart key comprising:
   a communication interface;
   a memory storing a classifier; and
   a processor configured to:
     generate a first signal by removing a carrier frequency of a signal received from a vehicle through the communication interface,
     demodulate the first signal and extract at least one of a second signal of a preamble region or a third signal of an idle region,
     extract a feature of at least one of the first signal, the second signal, or the third signal,
     input the at least one extracted feature into the classifier, acquire an output value of the classifier, and
detect whether there is a relay attack by using the output value.

2. The smart key of claim 1,
wherein the processor is configured to:
Fourier transform the first signal and extract a frequency expressing a bit 1 as the feature.

3. The smart key of claim 1,
wherein the processor is configured to:
extract a bit timing offset of the second signal as the feature.

4. The smart key of claim 1,
wherein the processor is configured to:
extract a duration time of the third signal as the feature.

5. The smart key of claim 1,
wherein the feature includes at least one of a mean, a standard deviation, an average deviation, skewness, kurtosis, a root mean square (RMS), a lowest value, a highest value, a zero-crossing rate (ZCR), or a non-negative count.

6. The smart key of claim 1,
wherein the processor is configured to:
normalize the output value by using a predetermined mean and a predetermined standard deviation, and
detect whether there is the relay attack by comparing the normalized output value with a predetermined threshold value.

7. The smart key of claim 1,
wherein the processor is configured to:
based on the relay attack not being detected, control the communication interface to transmit a response message for a challenge message received from the vehicle, and
based on the relay attack being detected, not transmit the response message.

8. The smart key of claim 1,
wherein the classifier is a support vector machine (SVM), and
the vehicle and the smart key are included in a passive keyless entry and start (PKES) system.

9. The smart key of claim 1,
wherein the received signal further comprises:
state information of the vehicle, and
the processor is configured to:
correct the at least one extracted feature based on the state information of the vehicle.

10. The smart key of claim 9,
wherein the state information of the vehicle comprises:
at least one of a temperature, humidity, or a battery residual amount.

11. The smart key of claim 1,
wherein the processor is configured to:
control the communication interface to transmit the at least one extracted feature to the vehicle, and
receive an updated classifier from the vehicle through the communication interface.

12. A detection model generation apparatus comprising:
a communication interface;
a memory; and
a processor configured to:
with respect to each of a plurality of signals received from a vehicle through the communication interface, generate a first signal by removing a carrier frequency,
demodulate the first signal and extract at least one of a second signal of a preamble region or a third signal of an idle region,
extract a feature of at least one of the first signal, the second signal, or the third signal, and
learn a classifier by using the at least one extracted feature, and calculate a normalization parameter of the learned classifier.

13. The detection model generation apparatus of claim 12,
wherein the processor is configured to:
Fourier transform the first signal and extract a frequency expressing a bit 1 as the feature, or extract a bit timing offset of the second signal as the feature, or extract a duration time of the third signal as the feature.

14. A control method of a smart key, the method comprising:
generating a first signal by removing a carrier frequency of a signal received from a vehicle;
demodulating the first signal and extracting at least one of a second signal of a preamble region or a third signal of an idle region;
extracting a feature of at least one of the first signal, the second signal, or the third signal;
inputting the at least one extracted feature into a classifier;
acquiring an output value of the classifier; and
detecting whether there is a relay attack by using the output value.

15. The control method of claim 14,
wherein the extracting the feature comprises:
Fourier transforming the first signal and extracting a frequency expressing a bit 1 as the feature.

16. The control method of claim 14,
wherein the extracting the feature comprises:
extracting a bit timing offset of the second signal as the feature.

17. The control method of claim 14,
wherein the extracting the feature comprises:
extracting a duration time of the third signal as the feature.

18. The control method of claim 14,
wherein the feature includes at least one of a mean, a standard deviation, an average deviation, skewness, kurtosis, a root mean square (RMS), a lowest value, a highest value, a zero-crossing rate (ZCR), or a non-negative count.

19. The control method of claim 14,
wherein the detecting comprises:
normalizing the output value by using a predetermined mean and a predetermined standard deviation; and
detecting whether there is the relay attack by comparing the normalized output value with a predetermined threshold value.

20. The control method of claim 14, further comprising:
based on the relay attack not being detected, controlling the communication interface to transmit a response message for a challenge message received from the vehicle, and based on the relay attack being detected, not transmitting the response message.

* * * * *